United States Patent Office.

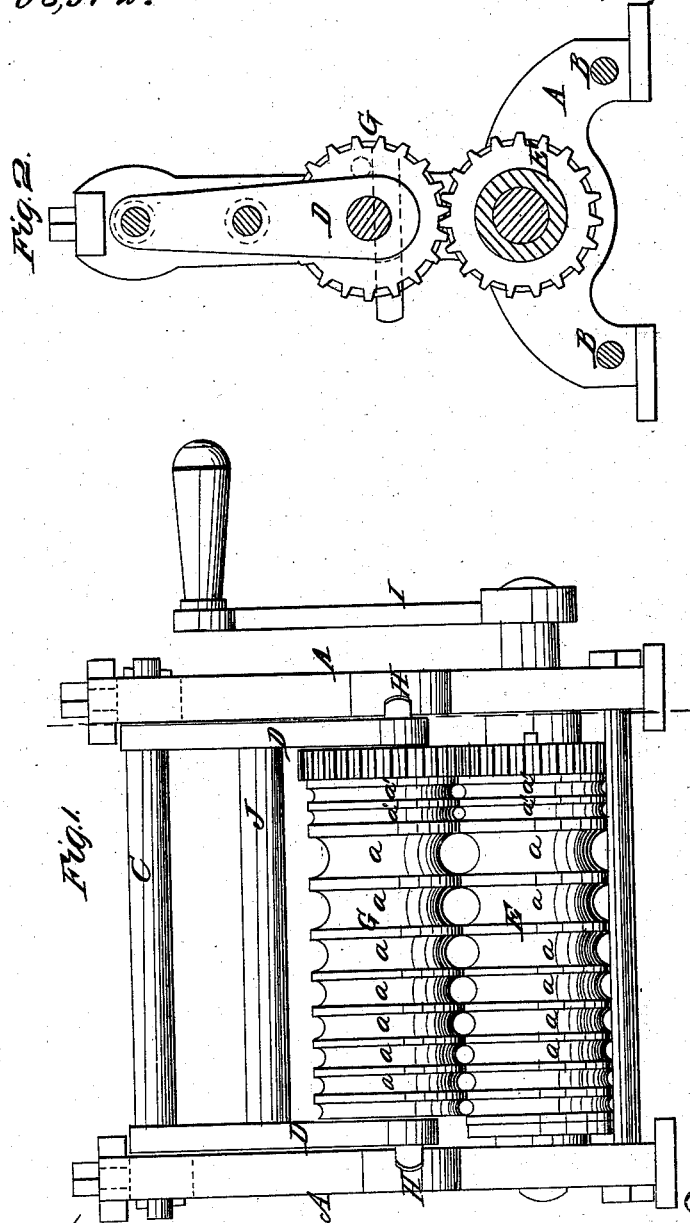

LUCUS B. GATES, OF BANE CENTRE, NEW YORK.

Letters Patent No. 68,972, dated September 17, 1867.

IMPROVED DEVICE FOR ROUNDING LINES.

*The Schedule referred to in these Letters Patent and making part of the same.*

TO ALL WHOM IT MAY CONCERN:

Be it known that I, L. B. GATES, of Bane Centre, in the county of Orleans, and in the State of New York, have invented certain new and useful improvements in Devices for Rounding Harness-Lines and Leather; and do hereby declare that the following is a full, clear, and exact description thereof, reference being had to the accompanying drawings, and to the letters of reference marked thereon. In the annexed drawings, making part of this specification—

A A represents a metallic frame, which consists of two uprights forked at their lower ends, so as to form a base for them to stand upon; said uprights being placed a suitable distance apart, and connected together by the rounds or long bolts B B and C. D represents a smaller metallic frame, which is placed between the two uprights above referred to, and consisting of two bars connected together by a round, J, and provided at their upper ends with holes or openings through which the round C passes, thus suspending said frame D between the uprights. G and E represent two metallic rollers, which are provided with a series of annular half-round grooves, $a$, which are graduated to suit the nature of the case, being made large at or near one end of the roller, and gradually decreasing in size as they approach the other. Two small grooves $a'$ $a'$ are seen at that end of the rollers where the large grooves commence, which are used for very fine work. The roller E is provided with an axle, which has its bearings in the two uprights near their lower or forked ends, while the roller G has an axle which has its bearings in the lower ends of the two bars of the frame D. The roller G lies immediately over the roller H, with their peripheries or the metal between the grooves touching lightly. When the two rollers are placed close together in this manner, the grooves of corresponding size in each being opposite, a round opening is formed, through which leather may be run for making it round. The shaft of each roller is provided with a gear-wheel, and these wheels mesh into each other. The shaft of roller E is provided at one end with a crank-handle, I. By turning the handle I the two rollers are set in motion. The frame D is allowed to swing upon the round C, so that roller G may be removed from its position over the roller E in order to place any piece of leather between the two which might have a buckle or other obstruction upon it which would not pass through the grooves. Two springs H upon the uprights of frame A catch the frame D, when it is in position, and secure it. By operating the springs from frame D it may be disengaged and allowed to swing out from its position.

This machine may be used to great advantage by harness-makers in making round portions of harness; the same machine making all sizes of round leather which it may be desirable to use.

Having thus fully described my invention, what I claim as new, and desire to secure by Letters Patent, is—

The springs H H in the frame A for securing the swinging frame D, when constructed with its rollers G and J, and combined with the roller E, the whole operating in the manner and for the purposes specified.

In testimony that I claim the foregoing I have hereunto set my hand this twenty-first day of April, 1867.

LUCUS B. GATES.

Witnesses:
WILLIAM H. GATES,
CLARK S. HUBBARD.